(12) United States Patent
Mershon et al.

(10) Patent No.: US 7,958,155 B2
(45) Date of Patent: Jun. 7, 2011

(54) SYSTEMS AND METHODS FOR THE MANAGEMENT OF INFORMATION TO ENABLE THE RAPID DISSEMINATION OF ACTIONABLE INFORMATION

(75) Inventors: Jeffrey David Mershon, Lambertville, NJ (US); Jef Russell Armstrong, Princeton, NJ (US); Daniel Reininger, Princeton, NJ (US); Andrew Jacob Cohen, Flemington, NJ (US); Raymond William Kulberda, Kendall Park, NJ (US); Dhananjay D. Makwana, North Brunswick, NJ (US); Rajeev Mago, Jamesburg, NJ (US)

(73) Assignee: Semandex Networks, Inc., Princeton, NJ (US)

( * ) Notice: Subject to any disclaimer, the term of this patent is extended or adjusted under 35 U.S.C. 154(b) by 454 days.

(21) Appl. No.: 12/148,177

(22) Filed: Apr. 17, 2008

(65) Prior Publication Data

US 2010/0023482 A1    Jan. 28, 2010

Related U.S. Application Data

(60) Provisional application No. 60/923,814, filed on Apr. 17, 2007.

(51) Int. Cl.
*G06F 17/30* (2006.01)
(52) U.S. Cl. .................................. 707/794; 707/803
(58) Field of Classification Search .................. 707/802, 707/628, 632, 794, 798, 803
See application file for complete search history.

(56) References Cited

U.S. PATENT DOCUMENTS

| 5,835,087 A | 11/1998 | Herz et al. |
| 5,974,417 A | 10/1999 | Bracho et al. |
| 6,006,272 A | 12/1999 | Aravamudan et al. |
| 6,029,195 A | 2/2000 | Herz |
| 6,055,364 A | 4/2000 | Speakman et al. |
| 6,154,745 A | 11/2000 | Kari et al. |
| 6,324,584 B1 | 11/2001 | Mandalia |
| 6,374,290 B1 | 4/2002 | Scharber et al. |
| 6,421,675 B1 | 7/2002 | Ryan et al. |
| 6,498,795 B1 | 12/2002 | Zhang et al. |
| 6,606,744 B1 | 8/2003 | Mikurak |
| 6,632,251 B1 | 10/2003 | Rutten et al. |
| 6,697,824 B1 | 2/2004 | Bowman-Amuah |

(Continued)

FOREIGN PATENT DOCUMENTS

CN    1299488 A    6/2001

(Continued)

OTHER PUBLICATIONS

Aguilera, M.; Strom, R.; Sturman, D.; Astley, M.; Chandra, T. 1999 "Matching Events in a Content-based Subscription System". Principles of Distributed Computing.

(Continued)

*Primary Examiner* — Cheryl Lewis
(74) *Attorney, Agent, or Firm* — Wilmer Cutler Pickering Hale and Dorr LLP

(57) ABSTRACT

Methods, systems and media are provided for turning large volumes of globally distributed data into actionable information by building a distributed semantic graph and maintaining such graph with up to date changes in data and client needs are provided. The semantic graph can be used to run subscriptions over interconnected semantic servers where each server can be capable of coupling to data sources, client applications and other semantic servers.

45 Claims, 11 Drawing Sheets

U.S. PATENT DOCUMENTS

| | | | |
|---|---|---|---|
| 6,701,362 | B1 | 3/2004 | Subramonian et al. |
| 6,922,567 | B1 | 7/2005 | Rydbeck |
| 6,965,920 | B2 | 11/2005 | Pedersen |
| 7,103,527 | B2 * | 9/2006 | Rajarajan et al. ............... 703/22 |
| 7,196,712 | B2 * | 3/2007 | Rajarajan et al. ............. 345/619 |
| 7,216,179 | B2 | 5/2007 | Ott et al. |
| 7,293,109 | B2 | 11/2007 | Ott et al. |
| 7,555,563 | B2 | 6/2009 | Ott et al. |
| 2002/0004844 | A1 | 1/2002 | Harari et al. |
| 2002/0022453 | A1 | 2/2002 | Balog et al. |
| 2002/0049727 | A1 | 4/2002 | Rothkopf |
| 2002/0062300 | A1 | 5/2002 | Asadov et al. |
| 2002/0062361 | A1 | 5/2002 | Kivipuro et al. |
| 2002/0091736 | A1 | 7/2002 | Wall |
| 2002/0150093 | A1 | 10/2002 | Ott et al. |
| 2002/0174050 | A1 | 11/2002 | Eynard et al. |
| 2003/0105826 | A1 | 6/2003 | Mayraz |
| 2003/0120817 | A1 | 6/2003 | Ott et al. |
| 2004/0022453 | A1 | 2/2004 | Kusama et al. |
| 2004/0042596 | A1 | 3/2004 | Kim et al. |
| 2004/0098449 | A1 | 5/2004 | Bar-Lavi et al. |
| 2004/0122891 | A1 | 6/2004 | Meyers et al. |
| 2004/0153545 | A1 | 8/2004 | Pandya et al. |
| 2004/0243715 | A1 | 12/2004 | Yokoyama |
| 2005/0021666 | A1 | 1/2005 | Dinnage et al. |
| 2005/0071674 | A1 | 3/2005 | Chou et al. |
| 2005/0128995 | A1 | 6/2005 | Ott et al. |
| 2005/0246423 | A1 | 11/2005 | Starbuck et al. |
| 2006/0029106 | A1 | 2/2006 | Ott et al. |
| 2007/0129073 | A1 | 6/2007 | Koch et al. |

FOREIGN PATENT DOCUMENTS

| | | |
|---|---|---|
| GB | 2341700 | 3/2000 |

OTHER PUBLICATIONS

Banavar, G.: Kaplan, M.; Shaw, K.; Strom, R.; Sturman, D.; Tao, T. 1999. "Information Flow Based Event Distribution Middleware". Middleware Workshop at International Conference on Distributed Computing Systems.

Banavar, G.; Chandra, T.; Mekherjee, B.; Nagarajarao, J.; Strom, R.; Stuman, D. 1999. "An Efficient Multicase Protocol for Content-Based Publish-Subscrube Systems" International Conference on Distributed Computing Systems.

Carzaniga, A. Wolf, A. 2001 "Design and Evaluation of a Wide-Area Event Notification Service" ACM Transactions on Computer systems (19(3): 332-383, Aug. 2001.

Carzaniga, A.; Rosenblum, D.; Wolf, A, 2000, "Content-Based Addressing and Routing: A General Model and Its Application" technical Report CU-CS-902-00, Department of Computer Science University of Colorado at Boulder, Jan. 2000.

Dao, S.; Perry B.; Shek, E.; Vellaikal, A.; Muntz, R.; Zhang, L.; Potkonjak, M.; Wolfson, O. 1999. "Semantic Multicast: Intelligently Sharing Collaborative Sessions". ACM Computing Surveys.

Dao, S.; Perry, B. 1996 "Information Dissemination in Hybrid Satellite/Terrestrial" Data Engineering Bulletin, 19(3):12-18, Sep. 1996.

Devanbu, P.; Stubblebine, S.; Uschold, M. 2000. "The Next Revolution: Free, Full, Open Person-2-Person (P2P) E-commerce." Workshop on Internet-scale software Technology University of California, Irvine, California, Jul. 3, 2000.

Duda, A.; Sheldon, M. 1994. "Content Routing in a Network of WAIS Servers" 14th IEEE International Conference on Distributed Computing Systems. Poland, Jun. 1994.

Ives, Z.; Levy, A.; Weld, D. 2000. "Efficient Evaluation of Regular Path Expression on Streaming XML Data". Technical Report UW-CSE-2000-05-02. University of Washington Department of Computer Science and Engineering.

Lukose, R., Adar, E., Tyler, J., and Sengupta, C. Shock: Communicating with Computational Messages and Automatic Private Profiles. In Proceedings of the Twelfth International World Wide Web Conference. 2003.

Opyrchal, L.; Astley, M.; Auerbach, J.; Banavar, G.; Strom, R.; Sturman, D. 2000, "Exploiting IP mUlticast in Content-Based Publish-Subscribe Systems" Proceedings of Middleware.

Ott et al., "The Journey Active Network Model," IEEE JSAC, vol. 19, No. 3, pp. 527-537, Mar. 2001.

Petrovic, M. et al. "S-ToPSS: Semantic Toronto Publish/Subscribe System," Proceedings of the 29th VLDB Conference, Berlin, Germany, 2003, pp. 1-4.

Segall B.; Arnold D. 1997, "Elvin has left the building: A publish/subscribe notification service with quenching." Austrian Unix Users Group Annual Conference pp. 243-255.

Sheldon, M., 1995 "Content Routing: A Scalable Architecture for Network-Based Information Discovery", Ph.D. Thesis, MIT.

Sheldon, M.; Duda, A.; Weiss, R.; O'Toole, J.; Gifford, D. 1994. "Content Routing for Distributed Information Servers" Proceedings of Fourth International Conference on Extending Database Technology, Cambridge, England, Mar. 1994.

Sheth, A. et al., "Semantic Association Identification and Knowledge Discovery for National Security Applications," Special Issue of Journal of Database Management on Database Technology for Enhancing National Security, (L. Zhou and W. Kim, Eds.), 16(1), 33-53, Jan.-Mar. 2005.

Sheth, A. et al., "Traveling the Semantic Web through Space, Time, and Theme," Semantics & Services, Published by the IEEE Computer Society, Mar./Apr. 2008, pp. 81-86.

Sturtevant, N.; Tang, M.; Zhang, L. 1999, "The Information Discovery Graph: Towards a Scalable Multimedia Resource Directory", Proceedings of IEEE Workshop on Internet Applications (WIAPP) San Jose, California, Jul. 1999.

\* cited by examiner

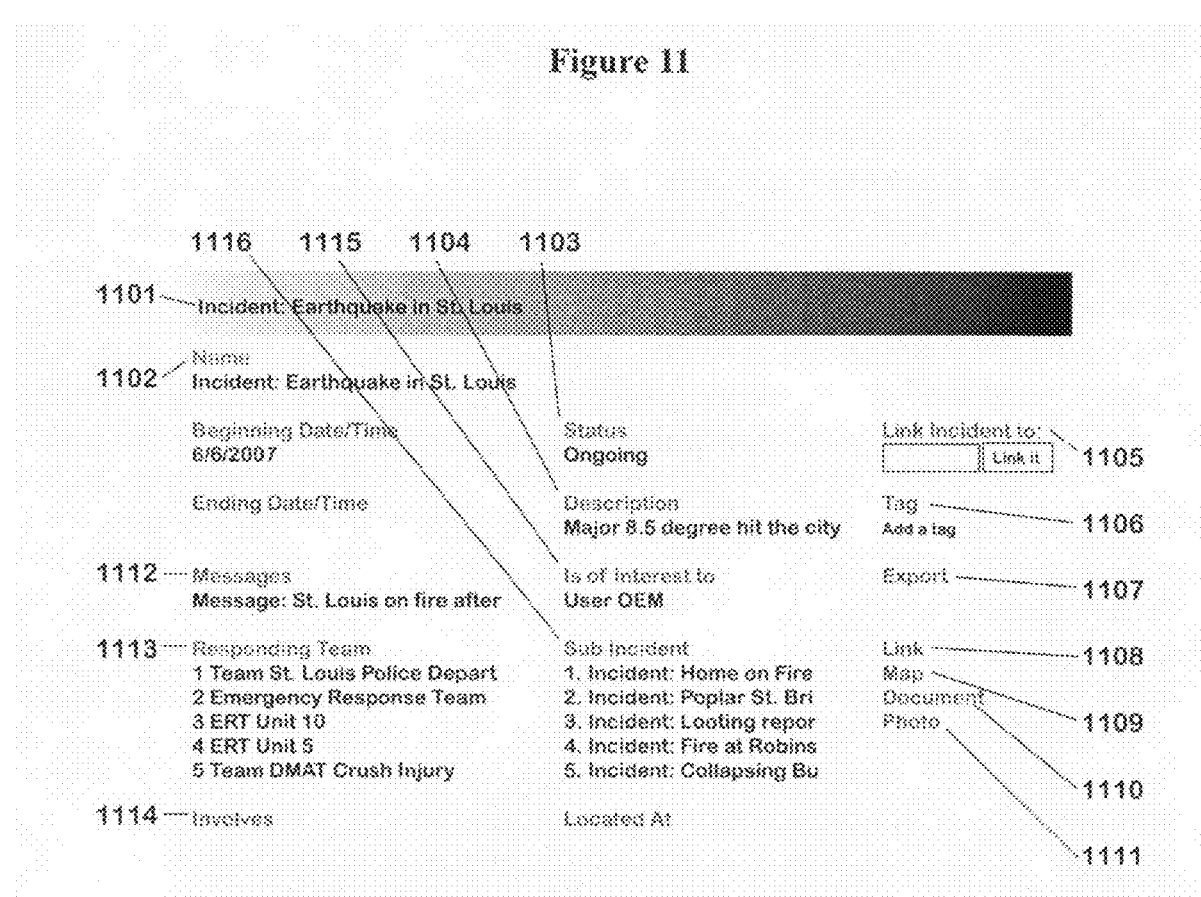

SYSTEMS AND METHODS FOR THE MANAGEMENT OF INFORMATION TO ENABLE THE RAPID DISSEMINATION OF ACTIONABLE INFORMATION

CROSS-REFERENCE TO RELATED APPLICATION

This application claims the benefit of U.S. Provisional Patent Application No. 60/923,814, filed Apr. 17, 2007, which is hereby expressly incorporated by reference herein in its entirety.

TECHNICAL FIELD

The disclosed subject matter relates to systems, methods, and media for the management of information to provide on-demand access to relevant portions of a semantic graph distributed among semantic servers to enable the rapid dissemination of actionable information.

BACKGROUND

Turning data into actionable information is a daily challenge for a number of professionals. Numerous entities including military personnel, emergency responders, business analysts and corporate security officers need effective ways to turn data into the information needed to act decisively. Actionable information enables a decision to be made and action is prompted as a result. In contrast, non-actionable information does not result in an immediate response or action.

An example of providing actionable information in a military context is a war-fighter on the ground who communicates with a system to inquire: "I am here, what threats have you seen within the last 10 minutes that can detract me from my objective, where did they come from, and should I engage them or avoid them."

The increase in the amount of data that can be taken into account to produce actionable information has led to the development of a new generation of information management applications capable of selective information dissemination where, the data is filtered to match client interests with available information.

Such systems can use event-based architectures such as publish-subscribe systems (hereinafter referred as "pub/sub systems"). In pub/sub systems, content producers (systems and end-users) publish messages (events) and content consumers (end-users and software applications) receive them if the message pertains to their interest described by means of a subscription. The system matches incoming messages against the subscriptions and forwards to content consumers just the messages that match the corresponding subscription. Early pub/sub systems were subject-based. In these systems, each message (event) belongs to a certain topic. Thus, subscribers express their interest in a particular subject and they receive all events published within that particular subject. A restriction of these systems can be the limited selectivity of subscriptions. For instance, in Sheth & Perry's 2008 article entitled "Traveling the Semantic Web through Space, Time and Theme," IEEE Internet Computing, pp. 81-86 in Vol. 12, No. 2, there is described a method for querying spatial and temporal data.

Later pub/sub systems are called content-based systems. In these systems, the subscriptions, constructs that indicate clients' interests, can contain complex queries or event semantics. Ontology is used to represent domain-specific knowledge and allow clients to use the ontology terms to construct subscriptions. Existing content-based and semantic systems have yet to handle rich domain semantics with temporal and geospatial constraints. A trade-off encountered by some systems, for example the one described in the online article by Petrovic, Burcea and Jacobson entitled "S-ToPSS: Semantic Toronto Publish/Subscribe System," available at http://www.eecg.toronto.edu/~jacobsen/papers/stopss.pdf, is that by increasing the semantic expressibility of the matching algorithms the system can fail to scale to cope with increasing volume, variety and velocity of incoming data.

Another problem with some systems as demonstrated, for example, in the system described in the article, found online at http://lsdis.cs.uga.edu/lib/download/SAA+2004-PI-STA.pdf, by Sheth et. al., 2005, Semantic Association Identification and Knowledge Discovery for National Security Application, is that filtering rules are embedded (hard-coded) in the ontology, making it very difficult to modify them by users as required. Maintaining the rules requires specialized knowledge engineering. This can preclude their effective use in a number of domains. For example, in the military domain rules can be created, updated and tailored by users that cannot deal with the often complex data structures of the ontology.

SUMMARY

In one embodiment, a method for providing at least one client access to a semantic graph distributed among a plurality of semantic servers is provided. The method comprises creating a semantic server page for concept instances represented on at least one of the plurality of semantic servers as a semantic data model, linking the concept instances through relationships declared in the semantic data model, storing the concept instances and relations, creating at least one subscription of interest over data in the semantic graph in response to a request from the at least one client, automatically collecting latest information from data sources connected to the plurality of semantic servers based on the at least one subscription, semantically annotating the collected information and sending alerts to the at least one client when new information is received in the semantic graph that results in changes to the semantic graph matching the at least one subscription of the at least one client. In some embodiments, the semantic data model includes at least one of individuals, organizations, places or events. In some embodiments, storing the concept instances and relations comprises storing the concept instances and relations as nodes and edges in the semantic graph. In some embodiments, semantically annotating the collected information comprises organizing and correlating the collected information with previous information in the semantic graph.

In another embodiment, a semantic server comprising an input/output module, a processor and memory is provided. The input/output module receives data from distributed sources in communication with the semantic server. The processor processes data based on semantically descriptive annotations of the data for forming a semantic graph that associates concept instances for determining the association of the data. The memory stores the semantic graph and, in some embodiments, stores the graph in a relational database. The concept instances can, in some embodiments, represent at least one of people, organizations, places and events. The semantic graph can in some embodiments comprise a data structure encoding relationships as typed links between a pair of typed nodes, a network of heterogeneous nodes and links, where the nodes and link types are related through an ontology, where the ontology can include concept instances such as nodes and relations as edges.

In yet another embodiment, a semantic network comprising a plurality of semantic servers in communication with each other is provided. Each of the plurality of semantic servers comprises an input/output module, a processor and memory. The input/output module receives data from distributed sources in communication with the semantic server. The processor processes data based on semantically descriptive annotations of the data for forming a semantic graph that associates concept instances for determining the association of the data. The memory stores the semantic graph. The semantic graph comprises a portion of a network semantic graph distributed across the plurality of semantic servers.

BRIEF DESCRIPTION OF THE DRAWINGS

FIG. 11 illustrates some embodiments of the semantic server information for an incident page showing how information surrounding an incident can be collected and organized in accordance with some embodiments of the disclosed subject matter.

DETAILED DESCRIPTION

Figure 1:
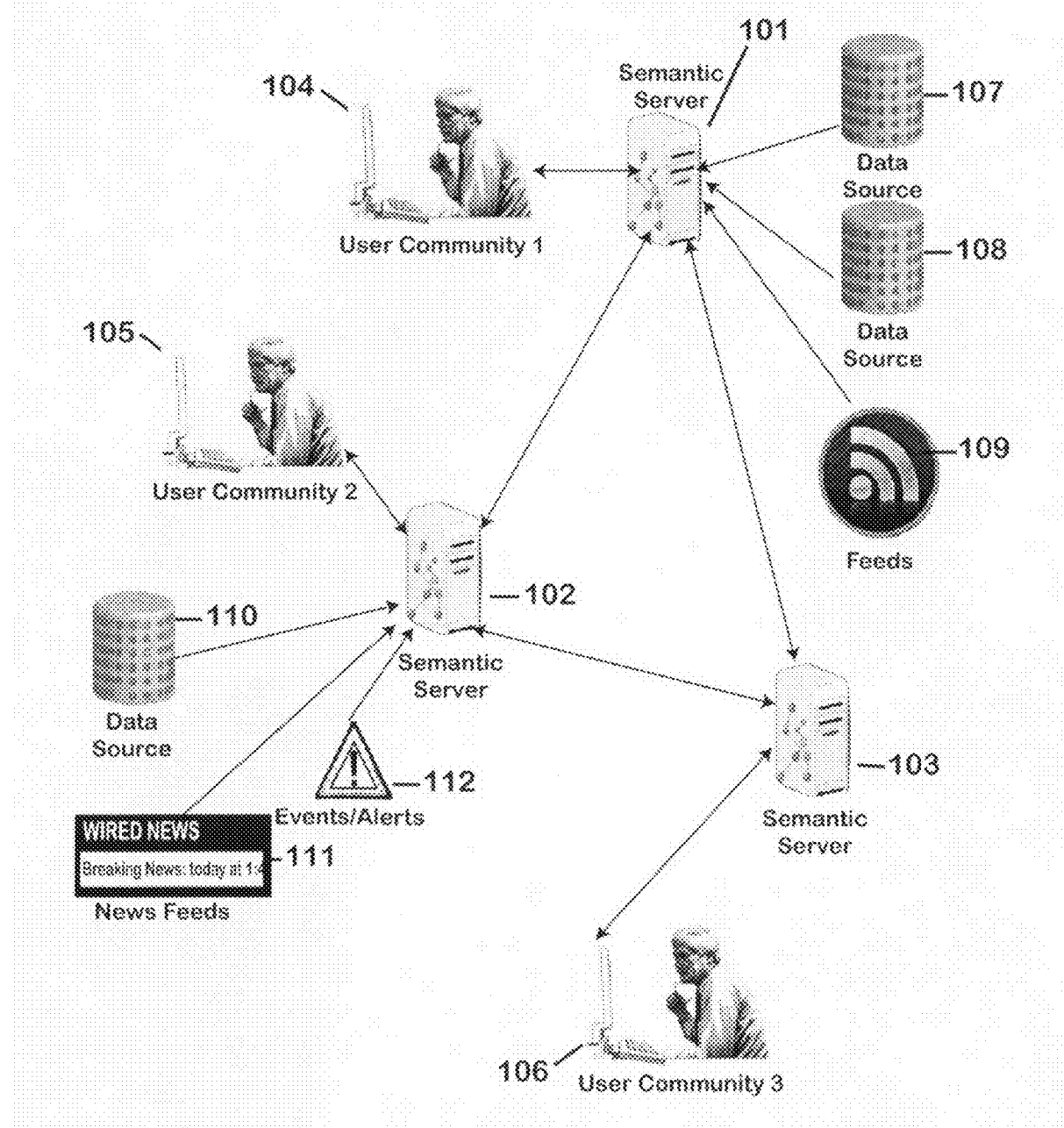
FIG. 1 illustrates an overview of a system for implementing some embodiments of the disclosed subject matter.

In the following description, specific details are set forth regarding the systems and methods of the disclosed subject matter and the environment in which the systems and methods may operate, etc., in order to provide a thorough understanding of the disclosed subject matter. It will be apparent, however, to one skilled in the art that the disclosed subject matter may be practiced without such specific details. In other instances, well-known components, structures, and techniques have not been shown in detail to avoid unnecessarily obscuring the subject matter.

In some embodiments, methods and systems to turn large volumes of globally distributed data into actionable information by building a distributed semantic graph and maintaining such graph with up to date changes in data and client needs are provided. The semantic graph can be used to run subscriptions over interconnected semantic servers where each server can be capable of coupling to data sources, applications and other semantic servers.

A semantic server can allow users to capture, annotate, link and share information based on semantic annotations on the data expressed on a common knowledge representation, called ontology. Semantic adaptors can be used to interface, for example, SQL databases, RSS feeds, Web Services, Flat Files, Web Pages (forms based posts), and real-time tracks and add or map semantically descriptive labels to the data. Semantic servers can also capture user-generated content.

In some embodiments, clients can access the semantic server by using various systems, such as, for example, a web browser or other client interface software. Applications can access the semantic server via application programming interfaces. Users and applications of a semantic server can be collectively called clients. Clients can create semantic server pages for concept instances represented in the semantic server as a semantic data model or ontology including, for example, individuals, organizations, places or events that are of interest to them. These concept instance pages can be linked through relationships declared in the ontology. The semantic server can store these concept instances and relations as nodes and edges in a semantic graph.

Clients can specify subscriptions of interest over data in the semantic graph. Based on those subscriptions, the semantic server can automatically collect the latest information from data sources coupled to it. Once the collected data is semantically annotated, it can be organized and correlated with previous data in the semantic graph. As the semantic graph changes, the semantic server can alert clients when new information comes in that match their subscriptions. The semantic servers can use commodity-computing servers and can be instantiated anywhere on a private network (intranet) or the public internet.

In some embodiments, data scalability can be improved by maintaining the distributed nature of information or copying all global information into a central repository. One way to manage the scalability issue is to use a "divide and conquer" approach where each semantic server can be specialized to subscribe to certain sections of the semantic graph and persists locally just the data with which it is in communication. Semantic servers can temporarily replicate portions of other server's semantic graphs, and then age/delete that data depending on usage by local consumers. This can provide global reach across all networked servers regardless of, for example, which server the client is locally accessing.

In some embodiments, systems, methods, and media to provide on-demand access to relevant portions of a semantic graph distributed among semantic servers and to manage the size of a semantic graph at each semantic server are provided.

A semantic server can receive data from distributed sources coupled to a plurality of servers. As data enters a semantic server, it can be processed based on its semantically descriptive annotations, forming a semantic graph that associates concept instances such as people, organizations, places and events together following a common knowledge representation or ontology. Because the associations are semantic and follow an ontology, a semantic server can know how various information elements are associated with each other.

Shown in FIG. 1 is a network of semantic servers 101, 102 and 103 in accordance with some embodiments. Each of the servers 101, 102 and 103 can include a semantic graph. A semantic graph, also known as a relational data graph or attributed relational graph, can be a data structure that encodes relationships as typed links between a pair of typed nodes. It can be a network of heterogeneous nodes and links. The nodes and link types can be related through an ontology (also known as a schema) that can include concept instances such as nodes and relations as edges. The semantic graph can be a data structure that each semantic server maintains in a relational database. In some embodiments, an example of a semantic graph can be the Internet Movie Database where the nodes can be persons (actors, directors, etc.), movies, studios, and awards, among others. In this example, each node can have a type (e.g., movie, director, producer, etc.). Each node can also be labeled with one or more attributes identifying the specific node (e.g., Shrek, Titanic, Airplane, etc.) or providing additional information about the node (e.g., gross revenues, release date, runtime, etc.). Links can also have types, for example, the (person->movie) link can be of type "acted-in" or "directed." Finally, links can also have attributes, for example, the link "acted-in" can have an attribute "year" having the value "in 2003."

In some embodiments, not every server needs to have records of all data within its semantic graph at the same time, so replicating the entire semantic graph across all semantic servers may not be desirable. In order to provide global knowledge on-demand to clients 104, 105, 106, without needing to replicate the entire semantic graph at each node semantic servers can subscribe to the portions of the semantic graph that are currently of interest to their clients at any given time. In order to provide these subscription capabilities the semantic server implements a server link interface 409 capable of forwarding portions of the semantic graph across servers on-demand without client intervention. The server link interface 409 can be an application 404 running on each semantic server.

Once a semantic server acquires a portion of the semantic graph from another semantic server, an aging algorithm can be used to age semantic graph portions that have been learned from other semantic servers. For each semantic graph node there can be a field that determines who is the originating or authoritative semantic server. The authoritative semantic server can be responsible for that concept instance as it can be, for example, communicating with the data source or communicating to the client that created that instance. Other semantic servers can "borrow" that concept instance from the parent and then age it.

In some embodiments, a user community can decide to maintain a copy of semantic graph nodes received from other servers because they can be used all the time; in other cases they may have been used a long time ago and not much lately, so they can be deleted and if needed they can be retrieved from the authoritative sever.

Figure 2:
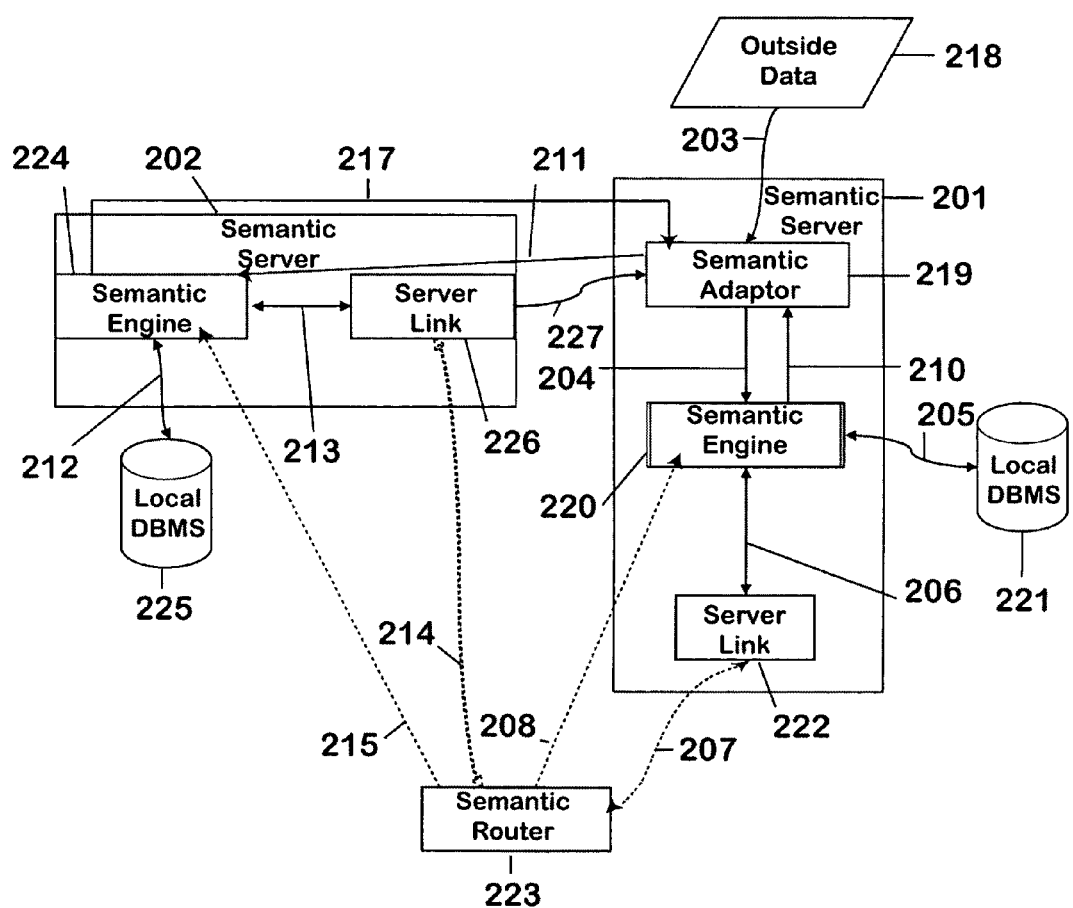
FIG. 2 illustrates the interconnection of a plurality of semantic servers in accordance with some embodiments of the disclosed subject matter.

What follows is a detailed description of the operation of a network of semantic servers where the semantic servers maintain a semantic graph that enables clients to receive actionable information as illustrated in FIG. 2 in accordance with some embodiments. Outside data 218 can be input into semantic server 201, either, for example, manually or as a result of an automated process (e.g., RSS feed, sent from another semantic server, etc.). Outside data 218 can include, for example, client data (e.g., from text extraction software, RSS feeds, etc.), and can be, for example, semantically structured. Semantic adapters 219 can process data to conform to the ontology used by the semantic server 201. In some embodiments, multiple adapters can be used, for example, if different data sources provide different types of information; each adapter can be tailored to a particular type of data source. If data already conforms to the ontology used by the semantic server (as it would if delivered from other semantic servers using the same ontology) that data can be passed to the semantic engine 224. In some embodiments, the data can be conformed with the ontology by means of a semantic adapter 219 to map the data meaning to the concepts and relations in the ontology. In some embodiments, the semantic server 201 can be designated to be an originator of outside data for semantic server 202. The semantic engines 220 & 224 can locally store processed information, adding a time-stamp to particular data to determine how recent it is. Semantic server 202 can request additional information (e.g., in response to an event triggered by data from semantic server 201, to optimize response times for future client queries, etc.) stored on other servers. Requests for additional information can be sent using any of a number of techniques, such as, for example, peer-to-peer mode across server link 226, being sent to the semantic router 223 using the server link interface 226, etc.

The information request can be passed to the semantic engines 220 & 224, which can find and compile all relevant information in the local databases 221 & 225 with which the semantic engines 220 & 224 interface. The semantic engines 220 & 224 can retrieve the requested information from the databases 221 & 225. The information retrieved by the semantic engines 220 & 224 at semantic server 201 can be sent to semantic server 202 and input into the semantic adapter 224 in, for example, the same manner that other local data sources are in communication with the semantic server 202.

The semantic server 202 can use a local database management system 221 & 225 to store and retrieve information efficiently. Various database management systems can be used, such as MySQL, Oracle, PostgreSOL, Microsoft SQL Server, etc., and depending on which system or systems are used, slightly different implementations of the processes in the semantic engine 220 & 224 can be used. In some embodiments, a local database can only contain a portion of the overall (distributed) semantic graph. The server link 222 & 226 can implement the interface used to communicate with other semantic servers over a network. It is also possible in some deployment scenarios, for example, to network the servers by means of server link implementations in a peer-to-peer configuration.

A semantic router 223 can be used to provide high performance routing of information across a network that is directing information requests and responses made through the server link interface 222 & 226 to the semantic server 201 & 202 containing the appropriate information. The router, can be, for example the router described in U.S. Pat. No. 7,216,179, entitled "High-Performance Addressing And Routing Of Data Packets With Semantically Descriptive Labels In A Computer Network," which is owned by the present assignee, and the disclosure of which is expressly incorporated by reference in its entirety herein.

A Semantic Server in Accordance with Some Embodiments

Figure 4:
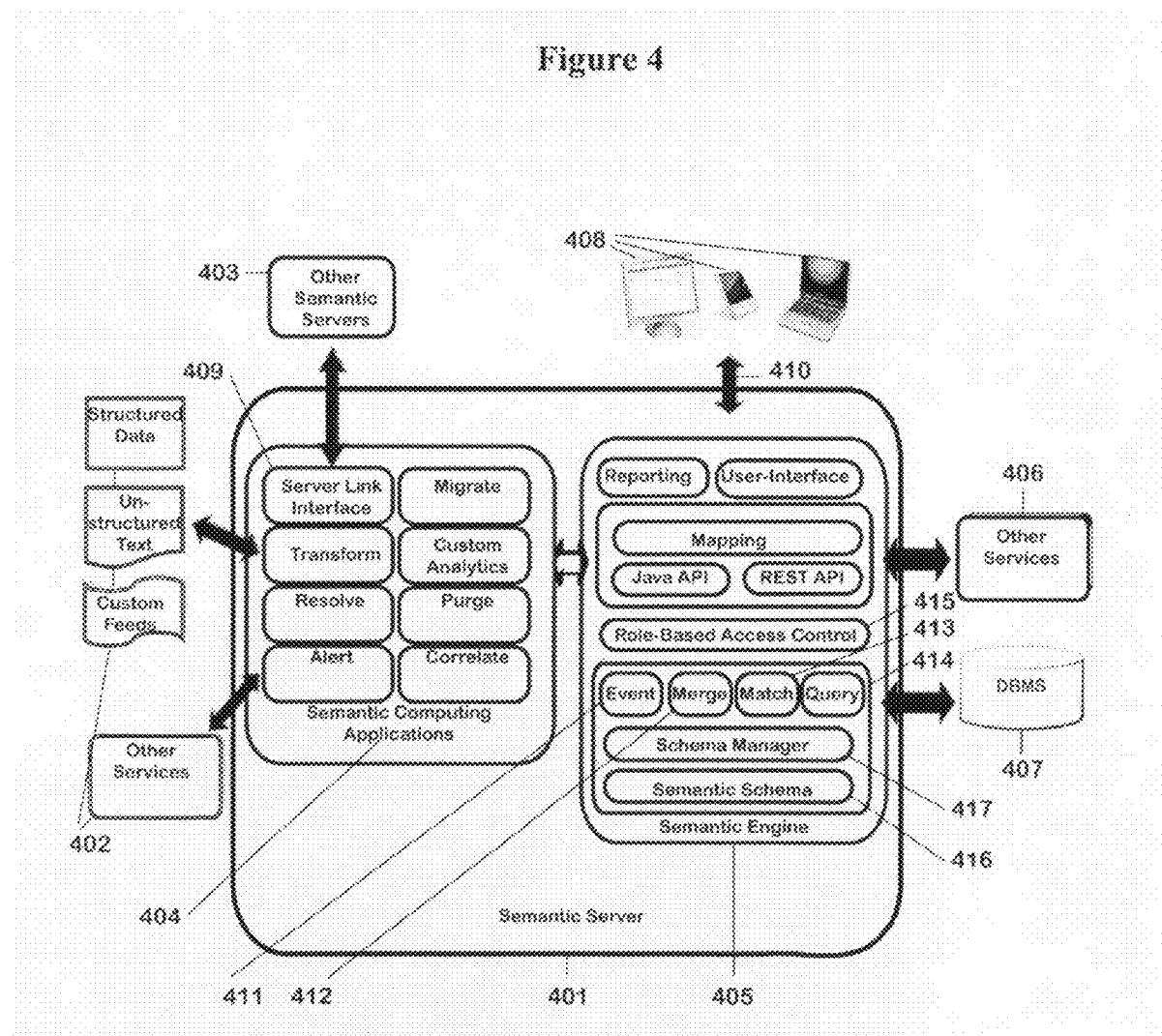
FIG. 4 illustrates an overview of a system for implementing the semantic server components for some embodiments of the disclosed subject matter.
Figure 5:
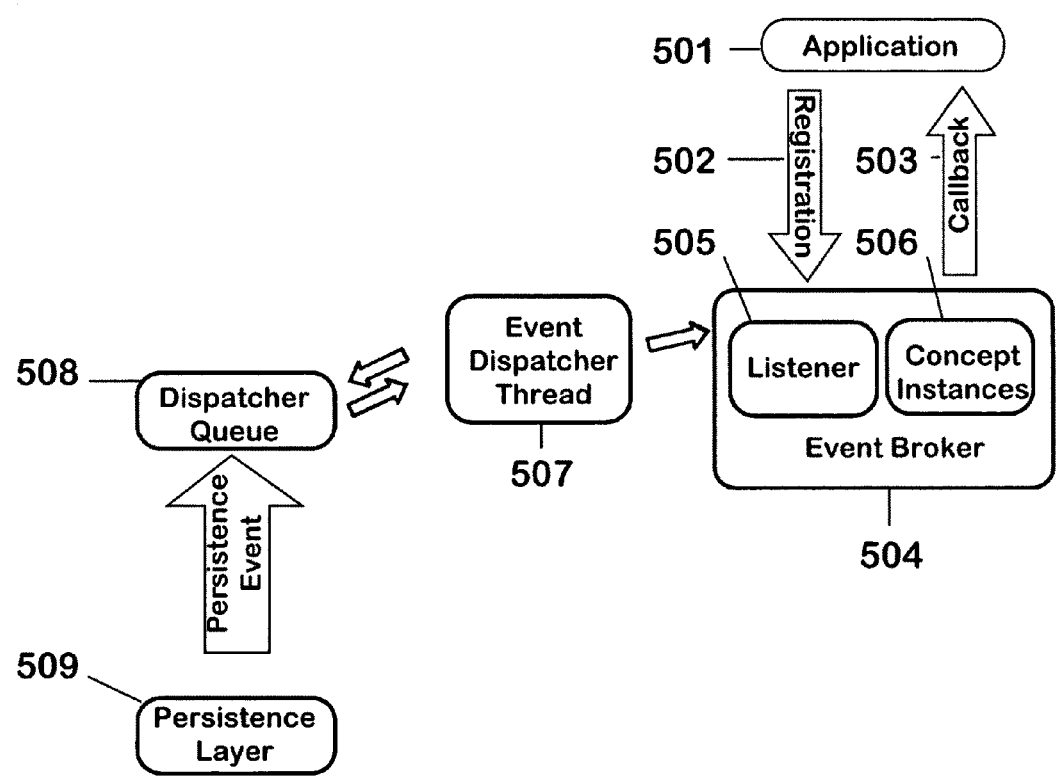
FIG. 5 is a flow diagram showing some embodiments of event management within the semantic server of some embodiments of the disclosed subject matter.

A software architecture of a system in accordance with some embodiments is illustrated in FIG. 4 as an overview of its applications, components, services and interconnected diagrams, includes a semantic engine 405 and a semantic server schema 416.

Semantic Engine 405

The semantic engine can perform the following functions: data matching 413 combining new data into matching concept instances already in the semantic graph; data merging 412 which merges information across subscriptions; and event management 411, which monitors and responds to changes in the semantic graph; and query 414, for finding information already in the graph.

Figure 3:
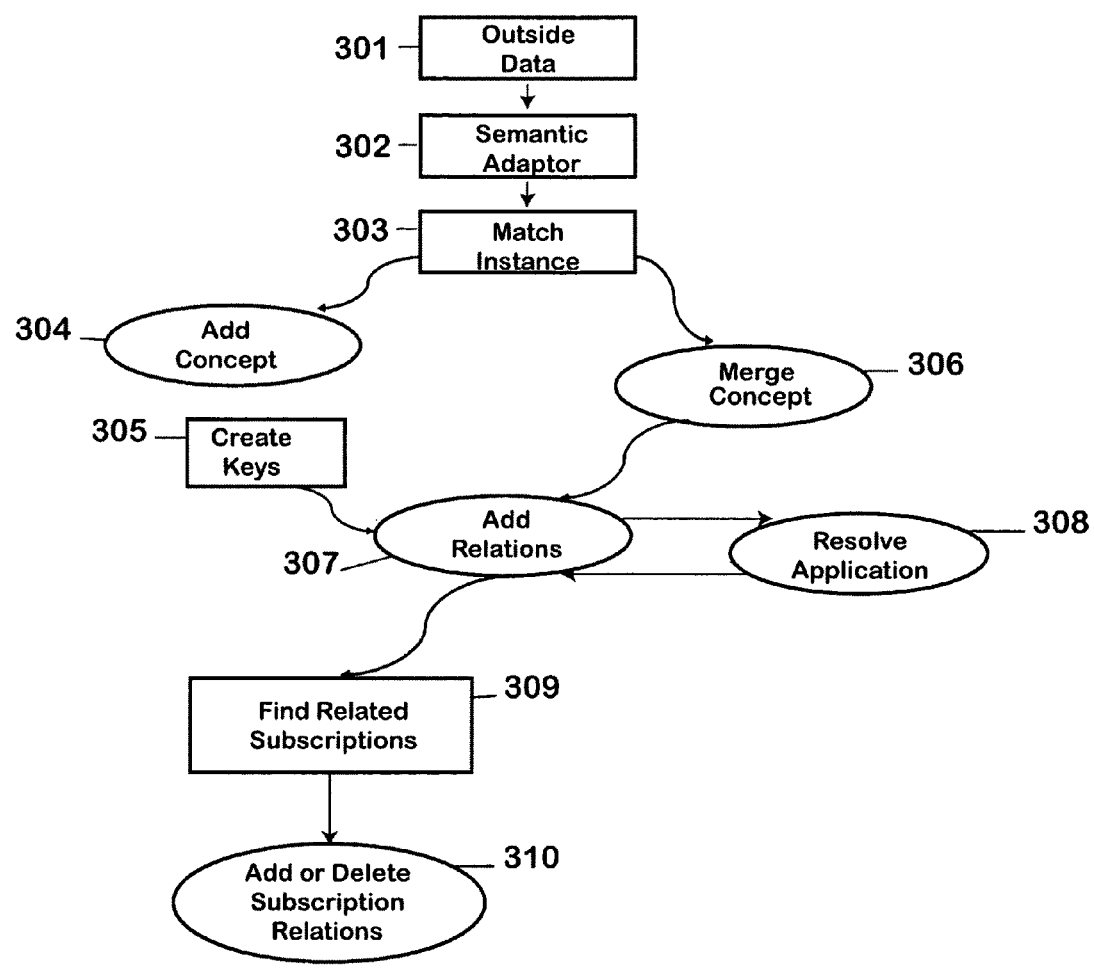
FIG. 3 is a flow diagram showing one example of the semantic server in accordance with some embodiments of the disclosed subject matter.

FIG. 3 illustrates a data flow process within the semantic engine impacting upon the semantic graph in accordance with some embodiments. It follows outside data 301 being processed 302-309 and at the subscription level 310. The data can enter the semantic engine 405 through the semantic adaptor 302. Match operation 303 can include inserting and/or updating concept instances, properties and/or relations in the semantic graph. The match process can be governed by rules which can be maintained as part of the schema. If the concept instance is not already in the graph, it can be added through the add concept 304.

Keys 305 can be constructs used by the match engine to determine whether and when new information is merged with existing information. Keys can be composite (e.g., comprising multiple properties) and have match rules which can include complex and/or fuzzy logic. If the data entering the semantic engine conforms to a concept instance already in the graph, any new information can be added to that concept instance. Keys 305 describe to the matching process 303 which particular properties in the match engine can be updated and the manner in which they can be updated. Based on this process, additional associations 307 can be created and if so can be added to the semantic graph according to the predefined ontology that defines concepts and relations 307. The semantic server can derive additional information not explicitly stored in the semantic graph by means of executing expressions that operate on the semantic graph data. For example, a portion of a semantic graph tracking the details of a phone call: the semantic server can derive a relation between two persons called "CommunicatesWith" having a given strength based on the number of calls involving telephones "OwnedBy" those persons.

The semantic engine can query the graph to determine which currently available subscriptions are related to the new concept instance 309 and what relations have been provided by this process 304, 306 and 307.

The information about relevant subscriptions can be used, along with the logical composition of different subscriptions, to determine whether a concept instance has a relationship with a subscription 310.

A Semantic Server Schema in Accordance with Some Embodiments

The semantic server 401 can employ a client-defined schema 416 to organize information stored within it. The schema 416 can be comprised of four components: concepts, properties, attributes and relations.

Concepts can represent persons, places and things in the real world. A concept instance can, for example, represent a single, specific person, such as George Washington, place or thing, or can represent a set of persons, places or things.

Properties can represent descriptive elements of concepts, such as, for example, the color of a person's hair, the latitude of a place, or the weight of an object. Properties can be typed, that is, the kind of data stored in a property is restricted to a specific type, such as integers, real numbers or character strings. Attributes can represent data about properties (metadata), and can be used for a variety of reasons within the semantic server such as tracking the last time a property was updated or specifying where the property will appear on a page in the server's user interface (presentation directives). The schema can support multi-valued properties, so that different sources can, for instance, report different hair color for George Washington if they have different information. This can be used, for example to support collaborative groups. User communities can decide how to handle conflicting information (either manually or automatically). Source attribution can be associated with each piece of information to its source, so, for example, the server can store the fact that Joe Analyst reported the color of George Washington's hair as being white.

Relations can represent meaningful associations between concepts. Relation instances can connect specific concept instances. For example, a relation Is_Married_To between two instances of the concept Person can be used to associate George Washington with Martha Washington. The Is_Married_To relation is not defined between Person and Automobile, for example, because that relation doesn't have meaning in the real world. A relation set can be a mechanism by which similar relations, such as George Washington Is_Married_To Martha Washington, reported by multiple sources, can be grouped together and treated as an entity. Rules for defining how specific relation sets are treated are defined in the schema.

Special Semantic Constructs in the Schema in Accordance with Some Embodiments

Because the semantic server can use the schema to control its operation, certain constructs specific to the operation of the server are included in the schema.

Schema Manager 417

The schema can be maintained in a semantic graph. Just as the data can have a concept instance for George Washington, the concept Person also exists as a concept instance in the semantic graph. Clients can manipulate the schema through a user interface. Transforming data between different schemas can be handled through the use of applications which modify the data appropriately. Depending on, for example, the implementation of the applications and/or the specific transformation being conducted, the semantic server can continue operation even while the schema is being transformed.

Supporting Evidence in Accordance with Some Embodiments

Concepts in the graph can be used as supporting evidence for other assertions including concept, property and relation instances. For example, an adverse drug event filing can serve as supporting evidence of a relation between a specific compound and contraindication, or an intelligence report can serve as supporting evidence of specific insurgent activity in a specified area. In addition, relations can have additional properties, such as degree and certainty, for specifying the strength, or affinity of two concept instances and the confidence in the relation's existence, respectively. In some embodiments, all data can be attributed to its source, whether it was a human user or data automatically entered through an application.

Subscriptions in Accordance with Some Embodiments

Subscriptions can be created by clients to indicate what they are interested in receiving information regarding and or alerts on. Within the semantic server schema subscriptions can be dynamic sets of concept instances in which each member conforms to some client-specified criteria. For example, a client can create a subscription for all Persons, all Persons having red hair, all Persons who are Members Of any organization, a specific organization, or Persons whose height is greater than 6', etc. Property and attribute value criteria can include operators, such as equals (=), starts with, contains, greater than, sounds like, etc. Subscriptions in the semantic server can be dynamic, in that, for example, new information can be routed to applicable subscriptions as it enters the semantic server, and a set of concept instances that belongs to a subscription can be constantly maintained. Set membership need not be recomputed each time a client requests the members of a subscription. Complex subscriptions can be created by chaining subscriptions together using logical operators. The section below entitled "Subscription Implementation and Semantic Applications in Accordance with Some Embodiments" can be reviewed for a more complete description of how subscriptions operate as well as their use in decision making processes supported by the semantically organized data.

Role-Based Access Control (RBAC) 415 in Accordance with Some Embodiments

User access privileges as well as concept, property and relation permissions can be stored in the semantic graph, providing fine-grained access control to specific concept, property and relation instances as well as coarser-grained access control based on the schema. In other words, permissions can be established at the concept level (e.g., Person) or on a per-instance basis (George Washington), or at the property (Person.name) or property instance level (George Washington.name). Access control can be managed within the semantic core which prevents unauthorized access.

Semantic Computing Applications 404 in Accordance with Some Embodiments

Semantic applications written to interface with the semantic server are represented in the semantic graph and are managed by system administrators through the user interface. Such applications have access to the event handling process used by the semantic server, which can allow them to dynamically respond to changes in the underlying data. Management can include, for example, stopping and starting applications as well as setting configuration properties.

An Example of a Semantic Computing Application 405 in Accordance with Some Embodiments Server Link Interface 409 provides network functionality for using semantic information distributed between multiple servers. This interface can implement services to determine the kinds of data available for integration from other servers and allows for the efficient transfer of that information from the database management systems of remote servers into the semantic engine.

Subscription Implementation and Semantic Applications in Accordance with Some Embodiments Subscriptions can allow clients to be notified of information changes of interest on the semantic graph. Subscriptions can be baselined or can be chained together to create dynamic subscriptions with high-order set constraints. The elements at the intersection of those sets can satisfy the constraints and can be of interest to the clients; as a result, client-defined actions including notification or subsequent processing can be initiated.

Clients can define subscription sets and change them as needed without changing the underlying ontology. For example, a subscription for males taller than 6' belonging to AAA can be chained with a subscription for people attending a class reunion at a Thomas Jefferson High School. The results at the intersection of both sets are instances of males taller than 6' belonging to AAA also attending the function. Additionally, this can allow subscriptions themselves to be represented as small schema, providing partially instantiated portions of the semantic graph to match structurally similar subscription schema and create events against this complex subscription type.

Persistent Logical Operations in Accordance with Some Embodiments

Subscriptions (set descriptors) can also be part of the semantic graph, so new content is attached to matching sets or removed from sets when it no longer matches as new information comes into the semantic server. Accordingly, subscriptions can be dynamically updated to reflect the actual state of data.

Examples of Baseline Subscriptions in Accordance with Some Embodiments

All X such that X IsA [typeOfConcept], where typeOfConcept is a class name, or concept name, such as Person, Facility, or Hospital. Subscriptions in the semantic server are always constrained in this manner, thus set membership is always homogenous by type.

All X such that X.propertyname [operator] [value], where property name is an attribute (property) of a concept, such as name, height, or hair color; operator is a comparator function, such as equals, greater than, or less than; which is used to compare the property value of each candidate member to the value provided in the subscription. Examples of this kind of subscription are: Person.height>60", or Person.name contains 'smith'.

All X such that X [relation] Y, where relation is a relation that is valid between concepts of type X and concepts of type Y, and Y is a specific concept instance. The relations that are valid between any two concept types are defined in the ontology and enforced by the semantic server. An example of this kind of relation is: Facility LocatedIn Place.name='Trenton'. In the semantic server, this subscription will match facilities that are geo-located within the polygon that describes Trenton as well as facilities that have an explicit LocatedIn relation to Trenton.

All X such that X [anyRelation] Y, a variation of the above in which any X that has any kind of relation to Y will be returned.

All X such that X [relation] Set "S", where set S is a list of members of a subscription.

The certainty with which a property value or relation is known varies, and a semantic server can provide native support for probabilities on both properties and relations. Consequently, we can capture information such as: Person has hair color="Brown" with =80% certainty, Person IsMemberOf Organization Y with <75% certainty and Person X IsSameAs Person Y with >50% probability.

Dynamic Subscriptions in Accordance with Some Embodiments

In some embodiments, subscriptions can continuously maintain information about the data meeting certain logical criteria and the criteria themselves can also be dynamic. For instance, a subscription can look for all "bird sighting" concepts with relation "near" a specific "Car" concept (e.g., a particular VIN#). This is qualitatively different from subscribing to a list of all bird sightings near a particular location because a car moves. In particular, the location value for the car can be updated at regular intervals, which can automatically trigger re-computation of the concepts that match the subscription at each update. Similar reasoning applies to subscriptions conditioned on time-based relationships (e.g., within 2 weeks of), since set membership depends on a moving variable. By allowing dynamic subscriptions in this way, the semantic server can retain data lost by typical query methods and can allow analysis not only to present states but also of the past development of different concepts.

Using Subscriptions to Abstract Information in Accordance with Some Embodiments

One application of subscriptions, combined with certain kinds of applications interfacing with the semantic server, can be to provide abstracted information about the current state and the development of sets of objects over time. Examples of the abstracted information can include a histogram of the time of day at which a particular event is likely to occur, or the typical duration of a given event. If a new event matches the logical requirement of a subscription but is a poor fit with observed information, this can cause the event to receive more thorough scrutiny. The event's low probability may mark a change in what is considered "typical". The current nature of subscription information means that events identified as "outside the norm" in this manner are identified quickly enough to enable action to be taken, whereas a query based system would not be able to consistently identify this kind of information as queries retrospectively assemble relevant data.

Semantic Server Interface in Accordance with Some Embodiments

External clients can interact with the semantic server using various application program interfaces to extract data from the server and to insert data into the server and can be used to customize requests for data including any concept, property or relations of interest from the semantic graph on the semantic server. Among the many possible APIs are a Java API and a Representation State Transfer (REST) API. The Java API provides a rich Java-language interface to the semantic server, including event management interface. The API requests and responses can be formatted in several different formats as would be understood by one skilled in the art, which can include but are not limited to XML, JavaScript Object Notation (JSON), Keyhole Markup Language (KML), etc. KML is the format used by Google Earth and Google Maps to manage the display of geographic data in an application. KML uses a tag-based structure with nested elements and attributes and is based upon the XML standard. See http://code.google.com/apis/kml/documentation/ for KML documentation.

Examples of a REST API in Accordance with Some Embodiments

Examples of requests and responses to a semantic server using a REST API in accordance with some embodiments:

1) This request is a basic request searching for all people with "red" hair and "blue" eyes performed over the semantic graph on the semantic server (labeled mysemanticserver on the formatted REST URL below.

```
{
  " query": {
    "concept": "Person",
    "eyeColor": "blue",
    "hairColor": "red"
  }
}
http://mysemanticserver.myorg.com/api/search?query={"query":
{"concept":"Person", "eyeColor":"blue",
"hairColor":"red"}}
```

2) This requests adds to the previous specifying all people with "red" hair and "blue" eyes, married to a person with name containing "Smith".

```
{
  " query": {
    "concept": "Person",
    "eyeColor": "blue",
    "hairColor": "red"
    "relations"; [{
      "relation":"MarriedTo",
      "object": {
        "concept":"Person",
        "name":"~= smith"
      }}]
  }
}
```

The formatted REST URL for the above query to the semantic server is as follows:

```
http://mysemanticserver.myorg.com/api/search?query={"query":
{"concept":"Person","eyeColor":"blue","hairColor":"red",
"relations":[{"relation":"MarriedTo","object":{"concept":"Person",
"name":"~= smith"}}]}}
```

3) This new request asks that incidents reported within a geographic area defined as a bounding box defined by the four points at the intersection of the pair of longitude and latitude coordinates specified.

```
{
  " query": {
    "concept": "Incident",
    "relations"; [{
      "relation":"LocatedAt",
      "object":{
        "concept":"Point",
        "properties":[{
          "name":"lat"
          "value":"><30.0222334 45.554333234"
        },{"name":"lon","value":"><110.3772284 120.0432934"
      }]
    }]
  }
}
```

The formatted REST URL for the above query to the semantic server is as follows:

```
http://mysemanticserver.myorg.com/api/search?query={"query":
{"concept":"Incident","relations":[{"relation":"LocatedAt",
"object":{"concept":"Point","properties":[{"name":"lat",
"value":">< 30.0222334 45.554333234"},{"name":"lon",
"value":">< 110.3772284 120.0432934"}]}}]}}
```

4) This request can go hand in hand with the previous request regarding incidents reported within a geographic area and queries which government facilities are located within that geographic area or bounding box.

```
{
  " query": {
    "concept": "GovernmentFacility",
    "relations"; [{
      "relation":"LocatedAt",
      "object":{
        "concept":"Point",
        "properties":[{
          "name":"lat"
          "value":"><30.0222334 45.554333234"
        },{"name":"lon","value":"><110.3772284 120.0432934"
      }]
    }]
  }
}
```

The formatted REST URL for the above query to the semantic server is as follows:

```
http://mysemanticserver.myorg.com/api/search?query={"query":
{"concept":"GovernmentFacility","relations":[{"relation":
"LocatedAt","object":{"concept":"Point","properties":
[{"name":"lat","value":::">< 30.0222334 45.554333234"},
{"name":"lon","value":":">< 110.3772284 120.0432934"}]}}]}}
```

5) This request can again go hand in hand with the previous two requests regarding incidents reported and government facilities are located within that geographic area or bounding box to call for critical facilities within that geographic area requiring evacuation

```
{
  " query": {
    "concept": "Facility",
    "relations": [{
        "relation":"DamageAssessments""object" {"concept":,
        DamageAssessmentForm""evacuees":"> 1"
    }
    "relation":"LocatedAt",
    "object":{
        "concept":"Point",
        "properties":[{"name":"lat","value":"><30.0222334
        45.554333234",},{"name":"lon","value":>< 110.3772284
        120.0432934"
    }]}}]}}
http://mysemanticserver.myorg.com/api/search?query={"query":
{"concept":"Facility","relations":[{"relation":
"DamageAssessments","object":{"concept":
"DamageAssessmentForm","evacuees":"> 1"}},
{"relation":"LocatedAt","object":{"concept":"Point",
"properties":[{"name":"lat","value":
">< 30.022233445.554333234"},{"name":"lon","value":
">< 110.3772284120.0432934"}]}}]}}&output=kml
```

The above is the formatted REST URL for the query to the semantic server.

6) This is another call for information regarding a defined location—a geographic area or bounding box and items within that framework, in this case Webcams.

```
{
  " query": {
    "relations": [ {
        "relation": "LocatedAt",
        "object": {
            "concept":"Point",
            "properties":[{
                "name":"lat",
                "value":"><30.0222334 45.554333234",
            },{
                "name":"lon",
                "value":>< 110.3772284 120.0432934"
            }]
        }
    }]
  }
}
http://mysemanticserver.myorg.com/api/search?query={"query":
{"concept":"Webcam","relations":[{"relation":
"LocatedAt","object":{"concept":"Point","properties":
[{"name":"lat","value":">< 30.0222334 45.554333234"},
{"name":"lon","value":">< 110.3772284 120.0432934"}]}}]}}
```

The above is the formatted REST URL for the query to the semantic server.

7) Another example of the diversity of REST API is to query a geographical area that is not point located or distance located but instead the boundary is created with way-points or vertices of a polygon that the specific client requires. This makes it possible to query for areas of the clients choosing, in this case, facilities in a polygon area of NJ.

```
{
  " query": {
    "concept": "Facility",
    "relations"; [{
        "relation":"LocatedIn",
        "object" {
            "concept":"Area",
            "properties":[{
                "name":"points","value":"33.190895082559,44.50250617961323
                33.2946322749708,44.54821925630344 33.3534668825965,44.56669790927921
                33.39569383693461,44.59222526980025 33.43558500215474,44.58023448893684
                33.45812976311904,44.59147750856869 33.46871761343864,44.56778562664994
                33.47433616577001,44.5340028889317 33.43343754896119,4450857466784407
                33.40807600771315,44.46955146987804 33.42416035556725,44.47383949978925
                33.45531530565751,44.44494515565168 33.46390583307113,44.40482027936798
                33.47593837230122,44.40884064430207 33.50808348365058,44.38809324504959
                33.5232149640989,44.3544063986286 33.53437056927877,44.32722883124981
                33.4225776656507,44.2655170743266 33.3637522588577,44.3074029488225
                33.34072624332946,44.24414456540904 33.26898853406711,44.23966927871513
                33.1985805876261,44.29860582864606 33.21376767155319,44.32391956253588
                33.19411052920491,44.36972111626387 33.190895082559,44.50250617961323
            }]
        }
    }]
  }
}
http://mysemanticserver.myorg.com/api/search?query={ "query":
{"concept":"Facility","relations":[{"relation":"LocatedIn","object":
{"concept":"Area","properties":[{"name":"points","value":
"33.190895082559,44.50250617961323 33.2946322749708,44.54821925630344
33.3534668825965,44.56669790927921 33.39569383693461,44.59222526980025
33.43558500215474,44.58023448893684 33.45812976311904,44.59147750856869
33.46871761343864,44.56778562664994 33.47433616577001,44.5340028889317
```

-continued

```
33.43343754896119,44.50857466784407 33.40807600771315,44.46955146987804
33.42416035556725,44.47383949978925 33.45531530565751,44.44494515565168
33.46390583307113,44.40482027936798 33.47593837230122,44.40884064430207
33.50808348365058,44.38809324504959 33.5232149640989,44.35322063986286
33.52437056927877,44.3272288312498 33.4225776656507,44.2655170743266
33.36375225888577,44.3074029488225 33.34072624332946,44.24414456540904
33.26898853406711,44.2396692787151 33.1985805876261,44.29860582864606
33.21376767155319,44.32391956253588 33.19411052920491,44.36972111626387
33.190895082559,44.50250617961323"}]}]}}&output=kml
```

The "points" property value can be a serialized list of space-separated points with longitude and latitude values separated by a comma. For example "lon1, lat1, lon2, lat2 lon3, lat3 . . . ".

8) This is another query showing the diversity of searching geographical areas in this instance event in a 20 mile circular radius around Princeton, N.J.

```
{
" query": {
    "concept":"Event",
    "relations"; [{
        "relation":"LocatedIn",
        "object" {
            "concept":"RadialArea",
            "properties":[{
                "name":"radius",
                "value":"20"
            }],
            "relations":[{
                "relation":"HasCenterPoint",
                "object":{"concept":"Point","properties":[{
                    "name":"lat","value":""33.33205243446228"
                },{"name":"lon","value":"44.41811246485631"}
                }]
            }
        }]
    }
}
}
http://mysemanticserver.myorg.com/api/search?query={ "query":
{"concept":"Event","relations":[{"relation":"LocatedIn","object":
{"concept":"RadialArea","properties":[{"name":"radius","value":
"20"}],"relations":[{"relation":"HasCenterPoint","object":{"concept":
"Point","properties":[{"name":"lat","value":""33.33205243446228"},
{"name":"lon","value":"44.41811246485631"}]}}]}}}&output=kml
```

9) This query takes the principal of the previous example, the circular radius search and applies it to a target that can be a moving target, in this case listing events in the circular area of 2 mile radius whose center is a particular vehicle.

```
" query": {
    "concept":"Event",
    "relations"; [{
        "relation":"LocatedIn",
        "object" {
            "concept":"RadialArea",
            "properties":[{
                "name":"radius",
                "value":"2"
            }],
            "relations":[{
                "relation":"HasCenterPoint",
                "object":{"concept":"Vehicle","properties":[{
                    "name":"tangoId","value":"=
                    123456" }]}
            }]
        }]
    }
}
}
http://mysemanticserver.myorg.com/api/search?query={ "query":
{"concept":"Event",relations:[{"relation":"LocatedIn",
object":{"concept":"RadialArea","properties":[{"name":
"radius",value":"2"}],"relations":[{"relation":"HasCenterPoint",
"object": {"concept":"Vehicle","properties":[{"name":
"tangoId","value":"= 123456"}]}}]}}}&output=kml&
```

In the above query, the semantic server takes the latest point, which is "Location of" the Vehicle, and treats it as the center of the circular area. As the vehicle moves, the circular area moves and different events are matched against the query.

10) Events in next 24 hours

```
{
" query": {
    "concept":"Event",
    "relations"; [{
        "relation":"LocatedIn",
        "object" {
            "concept":"TimeWindow",
            "properties":[{
                "name":"timeDelta",
                "value":"1440"
            }],
            "relations":[{
                "relation":"HasTime",
                "object":{"concept":"CurrentTime","properties":[{
                    "name":"ID","value":"=
                    123456" }]}
            }]
        }
    }]}
}
http://mysemanticserver.myorg.com/api/search?query={"query":
{"concept":"Event","relations":[{"relation":"LocatedIn",
"object":{"concept":"TimeWindow","properties":[{"name":
"timeDelta","value":"1440"}],"relations":[{"relation":"HasTime",
"object":{"concept":"CurrentTime","properties":[{"name":"Id",
"value":"= 123456"}]}}]}}}&output=kml&
```

In the above query, the "timeDelta" value is specified in minutes; with positive values for future and negative values for past events. Again, the CurrentTime instance with ID 123456 should exist as a page within the semantic servers. There can be a semantic application which periodically updates the CurrentTime instance to trigger the query match.

Applications for the Semantic Server in Accordance with Some Embodiments

Applications external to the semantic server can use its APIs to interact with the semantic graph, to provide input information to the graph, to automatically establish subscriptions and to act on alerts from the semantic server to clients. The semantic server and semantic graph described above can be used in various applications. The following applications represent example uses of the semantic server and semantic graph described above in accordance with some embodiments.

(1) Information on Demand for Tactical Users

Figure 6:
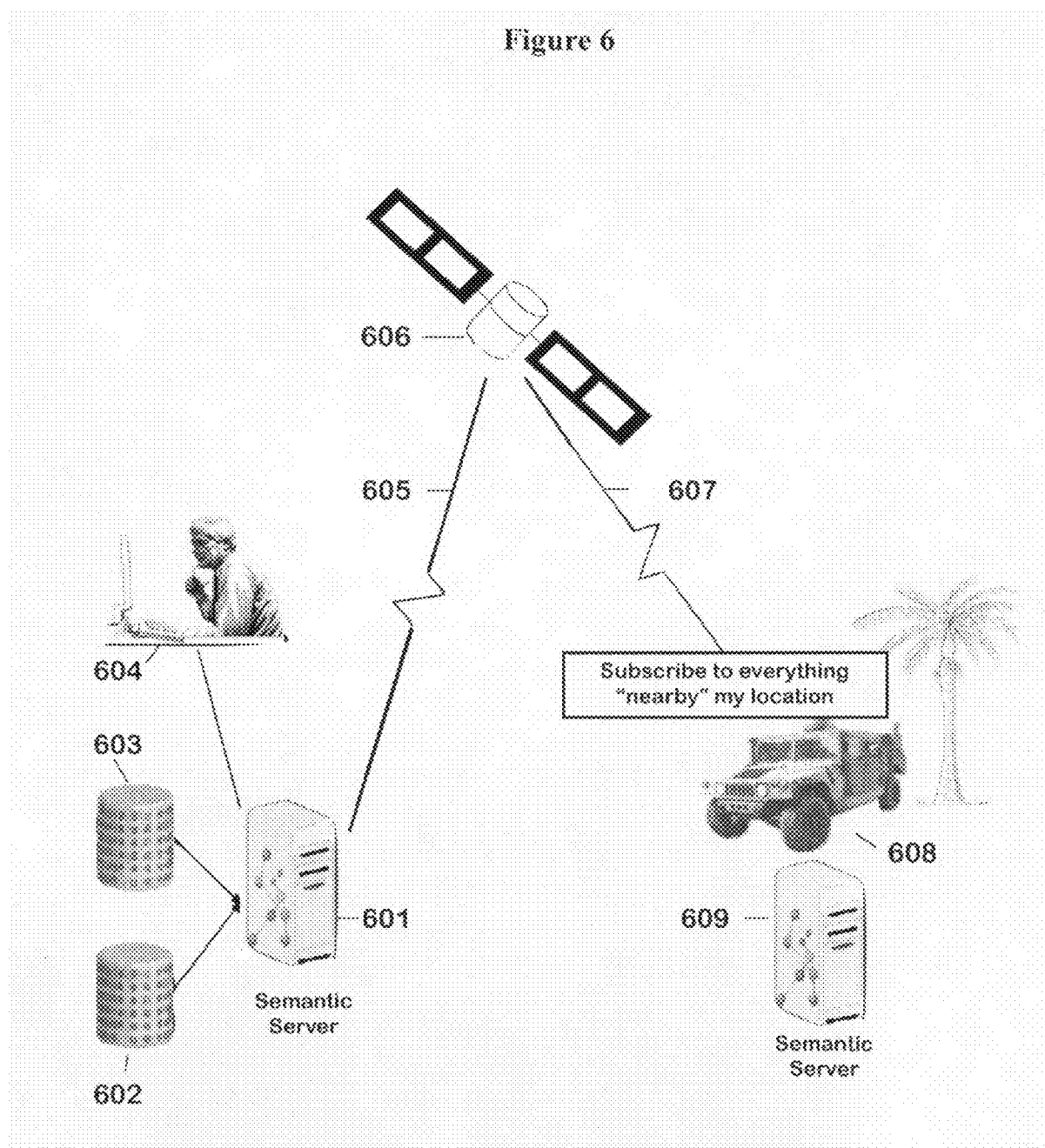
FIG. 6 illustrates an overview of some embodiments of the disclosed subject matter used for tactical military situations.

The following describes how at least one embodiment can be applied to deliver timely and relevant information on demand to military tactical users, for example, by leveraging capabilities to dynamically filter data from a plurality of disparate information sources with the user operational context that includes the state of the network and end user devices, the state of the end user; mission, role and Course of Action (CoA) dependencies. Because the semantic server can use an ontology for the semantic representation of each of the information on demand elements it can deliver alerts based on complex semantic trigger events (e.g., a suspect cell phone has just made a call into the tactical area of operations (AO), where cameras detect a person of interest). Dynamic, moving subscriptions provide tactical picture information into user displays based on unit or individual location 608 (see FIG. 6). Semantic representations of mission, role and CoA support adaptive information delivery as tactical situations evolve, and can provide predictive information and delivery based on contingency triggers or mission evolutions.

(2) Maritime Domain Awareness (MDA)

MDA can pertain to the effective understanding of anything associated with the global maritime environment that could impact the security, safety, economy or environment of the USA. The ability to maintain comprehensive knowledge of what is happening within the U.S. Maritime Domain, including visibility of vessels, cargoes and persons is essential in the United States quest for national and homeland security, which the MDA can provide. MDA can distinguish vessels conducting legitimate pursuits from those warranting closer inspection. Each member of the Global Maritime CoI (GMACOI) collects their own data and fuses that information with data and intelligence from other agencies, analyzing it and disseminating it to support informed decision-making at the strategic, operational and tactical levels. Threats that arise from a supply chain or the movement of people, or are made to the supply chain or movement of people are provided as alerts to MDA clients. These threats can employ or arise from any element within the domain including weather, vessels, people, cargo, infrastructure as well as related financial transactions.

A challenge in providing information superiority for future naval operations is to effectively capture, filter, semantically associate, analyze, and act on flows of data from disparate sources. Traditional data management and analysis software architectures can be challenged by the pace with the variety, volume and velocity of the data streaming into many of today's modern Command/Control and Intelligence systems. As a result, it is increasingly difficult to integrate this data into a holistic view that can help identify imminent or potential threats.

The MDA application can build and scale a capability that can support seamless global operations of maritime headquarters (HQ) cells through the use of a distributed semantic representation of data necessary for conducting operations. The MDA application can maintain the distributed nature of information or copy all global information into a central repository. According to at least one embodiment, a network of semantic servers attached to distributed data producers (sources and clients) are responsible to persist portions of the semantic graph derived from those data sources. Other semantic servers can temporarily replicate portions of the distributed semantic graph, and then age/delete them depending on, for example, usage by local consumers' clients. Consumers can subscribe to semantic network nodes and receive notifications of new "links of concern" or "emergent patterns of interest". Scaling (increasing semantic graph size while still delivering the responsiveness and availability needed) is achieved using the network running semantic servers as a platform for division of labor; this additionally provides performance improvement through dynamic load balancing, and very high availability.

Figure 7:
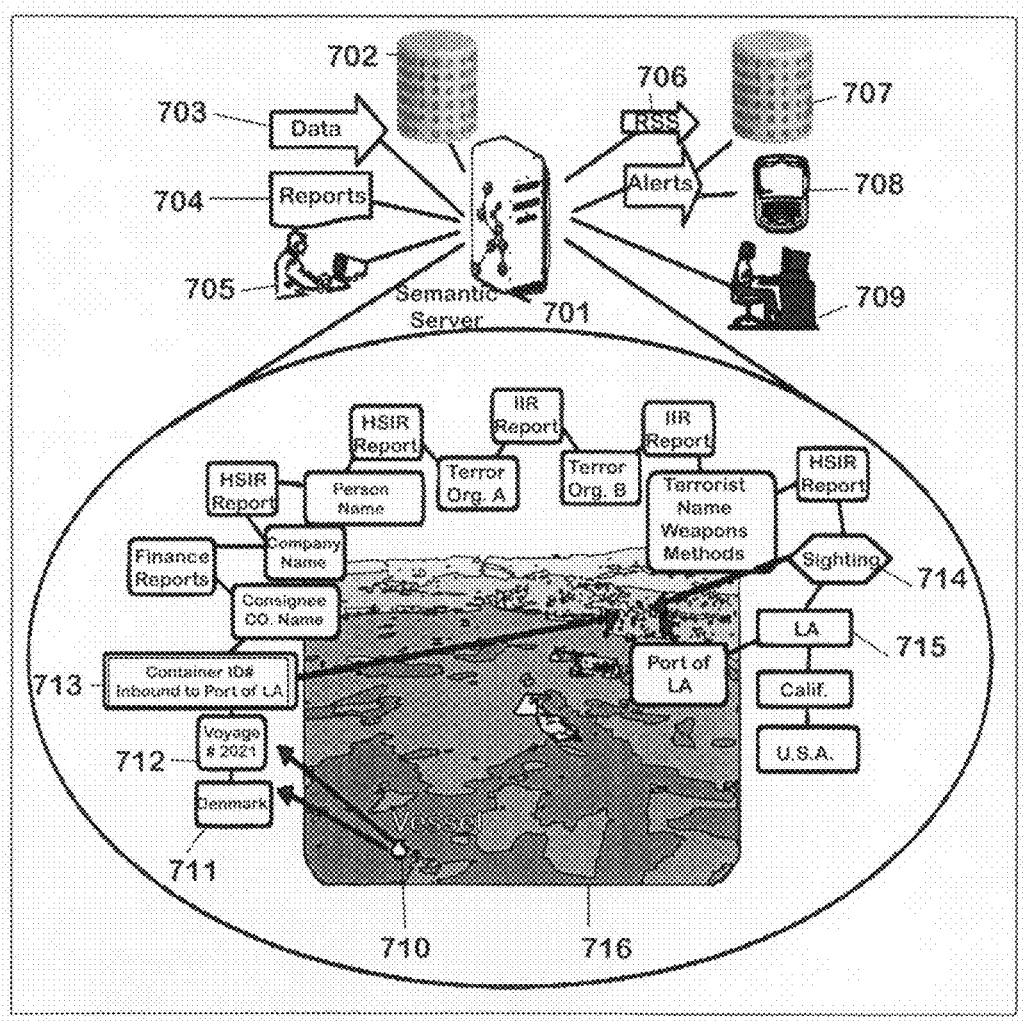
FIG. 7 illustrates an overview of some embodiments of the disclosed subject matter used for Maritime Domain Awareness applications.

FIG. 7 illustrates an embodiment that can provide Maritime Domain Awareness (MDA). The semantic server 701 can collect data from a plurality of sources, including databases 702, data streams 703, unstructured reports 704 and user inputs 705. The data can be organized semantically using a semantic schema developed by the Maritime Community of Interest. The semantic server can maintain a semantic graph with concepts and relations. For example, a semantic graph can capture Vessels of Interest 710, Strategic Lines of Communications (SLOCs), Choke Points, Ports, Cargo 713, Crew and Passenger identifiers such as Passport #, Group membership, activity relationships, etc. This organization can empower the tracking, refinement and analysis of maritime threats from disparate data sets. Through the semantic graph, clients can determine and track the relationships, location, assets and communications involved in an event. Semantically-tagged data also facilitates collaboration and sharing, linking dynamic clusters of concepts based on their semantics rather than linking documents. Concept instances can be exported in real-time to external tools such as criminal "workflow," anomaly detection and predictive analysis tools.

Clients 709 can establish Geospatial Maritime Zones anywhere in the maritime domain based on perceived vulnerabilities and tailored to the situation, geographic location and threat or risk. The shape and range of each area can be determined according to the decision-maker's needs.

The semantic server filters maritime events and displays a wide variety of semantically linked concepts combined with geospatial constraints, and alerts generated based on specific types of activity within surveillance zones. The alerts can be delivered via many options, for example-mail to mobile devices 708 or RSS feeds 707.

Figure 8:
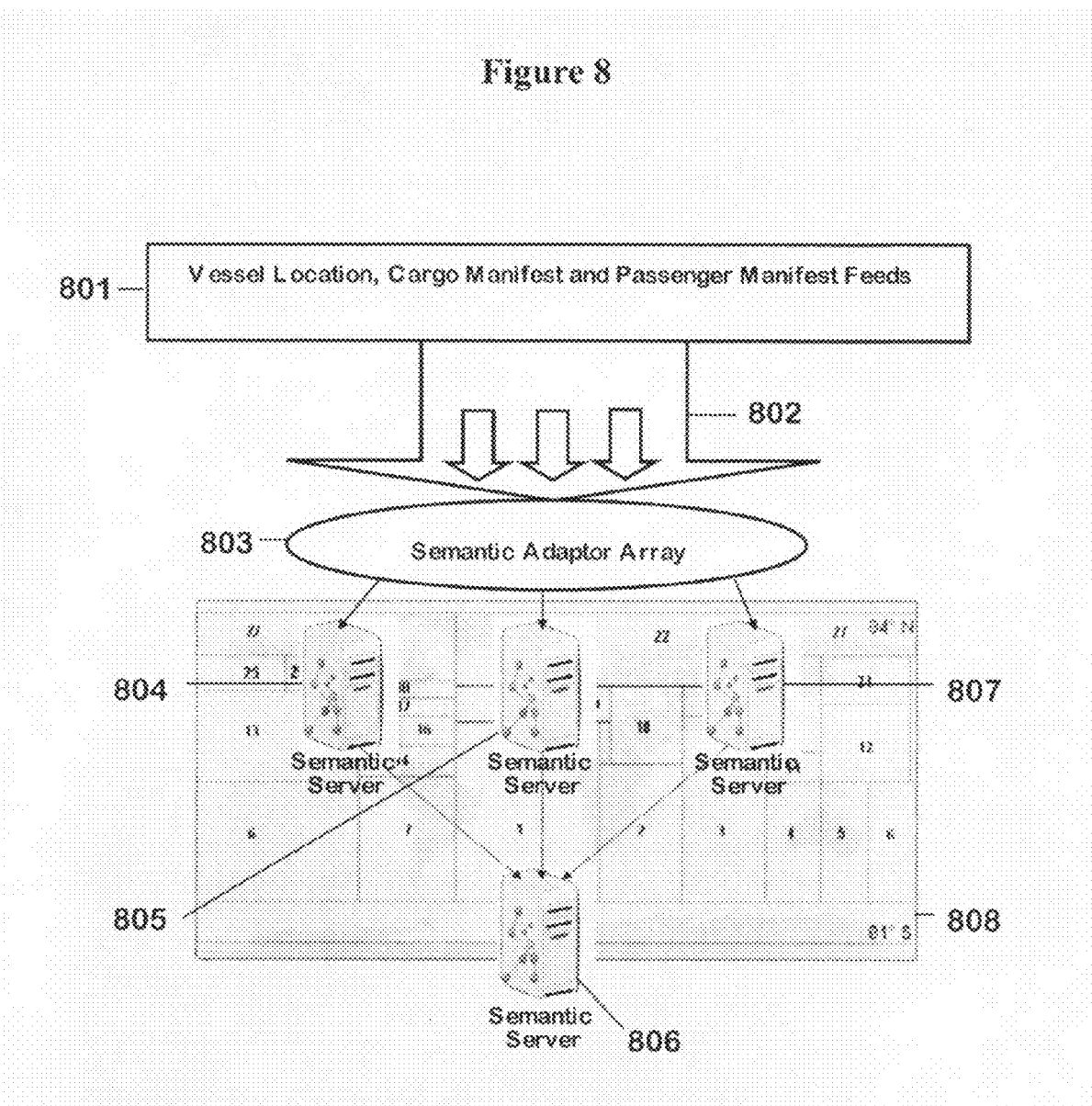
FIG. 8 is a flow diagram showing some embodiments of data flow through a semantic adaptor array to a network of semantic servers in some embodiments of the disclosed subject matter used for Maritime Domain Awareness applications.

FIG. 8 illustrates one embodiment of an MDA system, which can support wide-area Maritime Domain Awareness. One issue addressed by some embodiments of the disclosed subject matter is one of scalability, both in terms of collecting, organizing and processing at a volume, variety and velocity needed to perform effective wide-area MDA. Some embodiments provide a "divide and conquer" approach that can be based on the geographic specialization of semantic servers. A plurality of semantic servers 804, 805, 806, & 807 can be employed. Each one specialized and configured to subscribe to a certain region/sector of the world. Shown in the chart 808 is the world divided into 29 nautical regions. The semantic servers can also be specialized to track entity types such as types of vessels, routes, etc. A semantic adaptor array 803 can flow data inputs 802 containing entities of interest 801 with semantic markups according to the MDA semantic schema across the cluster of semantic serves. Events of interest can be forwarded to other semantic serves 806 that can interact with client applications.

(3) Emergency Management Situational Awareness

Emergency managers can require up-to-date, global views of geographically relevant information which can provide more time to assess a potential or unfolding event and can support development of strategies to react to events. Up-to-date information about events in an area of interest, and maintenance of current situational awareness regarding assets in the field including facilities, personnel, equipment and emergency programs in place can be used. This information can be accessible in a format that, for example, favors effective analysis and decision-making.

Some embodiments associate external data such as SQL databases, RSS feeds and web services easily. The semantic engine can process information from all data sources and people in one place. The application's customizable dashboard can clearly display status lists, Google Graphs and other selected items and sends alerts to notify its clients of changes of interest to them. It is event driven, with every change generating an event triggering actions as appropriate, delivering associated data for emergency managers to enhance their situational awareness and save time with its alerts and clear displays.

It can monitor risk/threats by connecting to all relevant sources of risk/threat information such as news feeds, sensors, email or message feeds, databases, and user generated data. It can provide global situational awareness by placing events and asset information in the right context. For example, if an event took place at location X, managers can observe what facilities are near that location, what assets they have in place, which personnel they should contact, and what hardware is in place at the location. Along those same lines it allows users to manage their assets. For example, it can assist users in identifying those personnel who require mandatory training, when supplies expire at a location, if a new Automated External Defibrillator ("AED") warden needs to be hired, etc. Additionally, the application can provide alerts to its clients, which keeps managers updated on changes of interest. For instance, when a new event occurs in an area of responsibility or when a supply of masks is nearing expiration, the manager receives an email alert.

Figure 9:
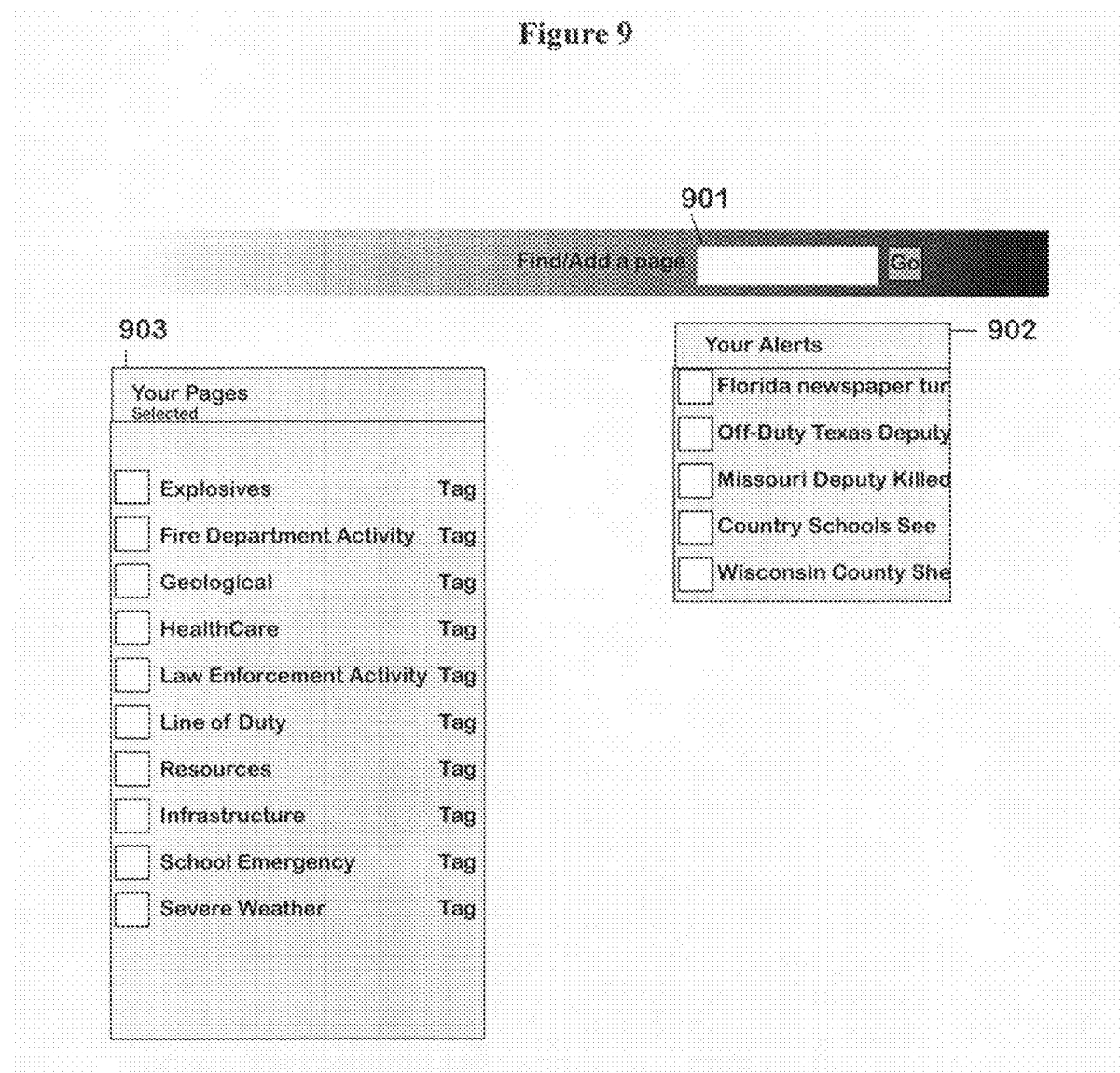
FIG. 9 illustrates a semantic server user page displaying alert notifications based on set requests for some embodiments of the disclosed subject matter.

This application can allow clients to monitor external and internal information with information clearly accessible as can be seen in FIG. 9. Managers can connect all the local, regional or national news feeds that they want to track to the semantic server 903. After letting the semantic server know the type of events which require alerts, the semantic server begins monitoring the news feeds and when a news item is published that speaks to an event of interest, an email alert is generated 902. With this application managers can track numerous information sources to maintain current event awareness and still have time for other duties.

Figure 10:
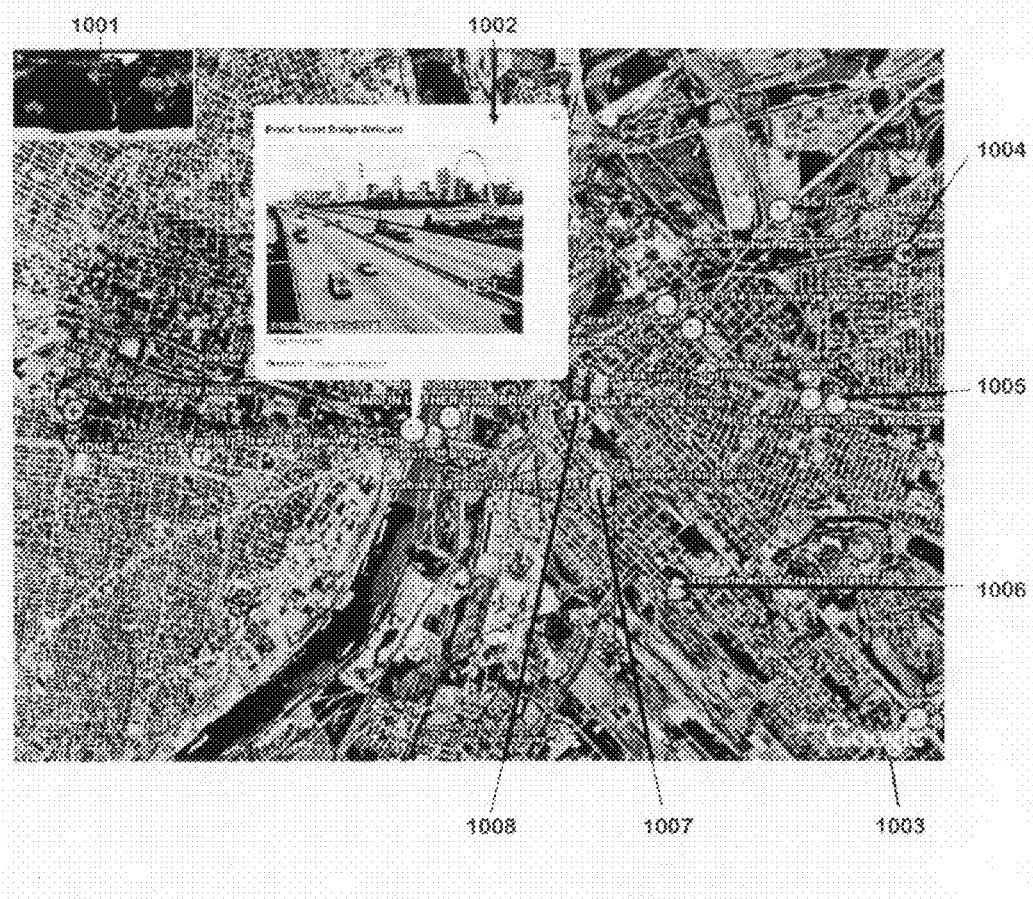
FIG. 10 illustrates some embodiments of the geographical visualization of information from the semantic server in accordance with some embodiments of the disclosed subject matter.

The information provided can be navigated through a web browser or other application such as e-mail, Google Earth, etc. FIG. 10 shows internal data that managers would have such as shelter facilities 1007, fire, police, or EMS data 1004, along with external data such as a crush injury 1008 and a live Webcam feed 1002 all displayed through the application Google Earth 1003.

For instance, suppose there is an earthquake in the city of St. Louis as is illustrated in FIG. 11. The incident manager wants to rapidly assess the situation to understand the magnitude of the task at hand and the resources available to respond to it. An incident page can display information regarding the incident, relevant messages 1112, incidents resulting from the initial incident 1116, teams called to respond to it 1113, etc.

The incident page gives managers a quick comprehensive look at the overall situation, and allows them to drill down into specific areas of interest. For instance, by clicking on the links, managers can find out more information about the specific teams responding to the incident, or about other incidents that may be close to the base. They can also use the system search capabilities to rapidly navigate to specific pieces of information of interest.

By enabling multiple managers to actively contribute information, the semantic server becomes an effective collaboration tool, where the knowledge of the community is enhanced by the individual knowledge of all the participants. Moreover, through the systematic collection of information and by keeping track of data attribution it is possible for all emergency management personnel that have a right to know to keep track of all the information in a standard format and in a way that can be easily understood and audited.

(4) Corporate Security

For corporate security, the semantic server can keep information regarding a specific facility, employee, or vendor in its own subscription page. To find out who the contact person is for the 1585 Main St. facility, you go to the "1585 Main St. facility" page. Furthermore, each page can connect to all the pages that are associated to it. For example, if John Smith works at the 1585 Main St. facility, then John Smith's page is linked to the 1585 Main St. facility page.

The ability to monitor important external and internal information is provided. Corporate security managers can connect all public and private news feeds that they want to track through the semantic server, or forward email news/alerting services to it. They can also track changes to supplies, personnel, vendors, etc. Email alerts can be set as needed, for example, every time a news item is published that speaks to an event or page of interest.

The semantic server also lets security managers connect to internal company data, such as realty and human resources databases. This can allow them to find out immediately when a new building has been leased, or when one of the emergency response wardens is transferred to a different location. In addition, managers can input information into the semantic server regarding corporate security programs, supplies and equipment through the systems' wiki-like user interface.

For instance, suppose the semantic server receives an email alert from an event monitoring service that an explosion has just occurred in downtown New York City. The corporate security manager wants to rapidly assess the situation to understand what assets they have in the area that could potentially be affected. The facilities page provides a comprehensive look at the assets available at that facility: contact people, departments, floor facilities, etc. For instance, by clicking on the floor-facilities links managers can find information regarding supplies and equipment available at each floor, SIP, AED teams, contact personnel, and other.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

What is claimed is:

1. A method for providing at least one client access to a network semantic graph distributed among a plurality of semantic servers wherein the network semantic graph comprises concept instances and relations between the concept instances, the method comprising:
   receiving first data including semantically distributed annotations from distributed data sources in communication with the plurality of semantic servers;
   based on the first data including the annotations, linking the concept instances using the relations;

storing the concept instances and relations as a local semantic graph comprising a part of the network semantic graph;

creating at least one subscription of interest over the network semantic graph in response to a request from the at least one client;

collecting second data from the distributed data sources based on the at least one subscription;

semantically annotating the second data;

updating the local semantic graph based on the semantic annotation;

sending alerts to the at least one client based on updates to the local semantic graph matching the at least one subscription of the at least one client.

2. The method of claim 1 wherein the network semantic graph represents at least one of individuals, organizations, places or events.

3. The method of claim 1 wherein storing the concept instances and relations comprises storing the concept instances and relations as nodes and edges in the local semantic graph.

4. The method of claim 1 wherein semantically annotating the second data comprises organizing and correlating the second data with the first data stored in the network semantic graph.

5. The method of claim 1, wherein the semantic graph includes a schema representative of at least one of concepts, properties, attributes and relationships of data elements.

6. The method of claim 5 further comprising modifying the schema while the plurality of semantic servers continue operation.

7. The method of claim 1, further comprising using portions of the semantic graph as evidence for assertions involving concept, property and relation instances for other portions of the semantic graph.

8. The method of claim 1, wherein a data source is represented in the semantic graph as a concept instance with at least one source identifier associated therewith that is available when accessing the concept instance in the semantic graph.

9. The method of claim 1, wherein the at least one client is represented in the semantic graph as a concept instance.

10. The method of claim 1, wherein the at least one subscription represents client-specified criteria.

11. The method of claim 1, wherein the network semantic graph includes access control information defining which concept instances the at least one client can access.

12. The method of claim 1, wherein the at least one subscription identifies a point location defined by at least one of coordinates or area location defined by the boundaries of a polygon and wherein the at least one subscription matches with an update to the network semantic graph if the update includes a location property matching at least one of a point location or a location within the boundaries of a polygon.

13. The method of claim 1, wherein results of at least one subscription change as a result of at least one of time and location.

14. The method of claim 1, further comprising establishing behavior of at least one concept instance over time and using the established behavior to detect at least one anomaly in the behavior of the at least one concept instance.

15. The method of claim 1, wherein the at least one subscription comprises a plurality of temporal events, further comprising sending alerts to the at least one client when at least one of the plurality of temporal events occur.

16. The method of claim 1, wherein the at least one subscription comprises a moving window of time.

17. The method of claim 1, wherein the network semantic graph being representative of at least one of military tactical information, maritime domain information, emergency management information and corporate security information.

18. The method of claim 1, further comprising receiving a query from the at least one client; searching the network semantic graph based on the query; and sending the at least one client a response based on a result of the searching.

19. The method of claim 1, wherein some of the distributed data sources include attributes of the at least one client.

20. A semantic server storing a local semantic graph comprising concept instances and relations between the concept instances, the semantic server comprising:

an input/output module to receive data including semantically descriptive annotations from distributed sources;

a processor programmed to process data based on the semantically descriptive annotations of the data to form the local semantic graph that associates the concept instances with each other using the relations, to create at least one subscription of interest in response to a request from at least one client and to send at least one alert to the at least one client based on updates to the local semantic graph matching the at least one subscription of the at least one client; and memory for storing the local semantic graph, the local semantic graph comprising part of a network semantic graph distributed among a plurality of semantic servers.

21. The semantic server of claim 20 wherein the concept instances represent at least one of people, organizations, places and events.

22. The semantic server of claim 20 wherein the local semantic graph comprises a data structure encoding relationships as typed links between a pair of typed nodes.

23. The semantic server of claim 20 wherein the local semantic graph comprises a network of heterogeneous nodes and links.

24. The semantic server of claim 23 wherein the nodes and link types are related through an ontology.

25. The semantic server of claim 20 wherein the local semantic graph is stored in a database.

26. The semantic server of claim 20, wherein the semantic server further includes at least one semantic application for processing data represented by the semantic graph, the at least one semantic applications being represented as a concept instance on the semantic graph.

27. The semantic server of claim 20, wherein semantic applications being added to the semantic server while the semantic server operates without disrupting operation thereof 28. The semantic server of claim 20, wherein the local semantic graph includes a schema representative of at least one of concepts, properties, attributes and relationships of data elements.

29. The semantic server of claim 28, wherein the processor is further programmed to modify the schema while the semantic server continues operation.

30. The semantic server of claim 20, wherein the at least one subscription includes a plurality of temporal events for the at least one client and wherein the processor is further programmed to track results of at least one subscription change as a result of at least one of time and location.

31. The semantic server of claim 20, wherein the processor is further programmed to establish behavior of at least one concept instance over time and to use the established behavior to detect at least one anomaly in the behavior of the at least one concept instance.

32. The semantic server of claim 20, wherein the at least one subscription includes a plurality of temporal events for the at least one client and wherein the processor is further programmed to send alerts to the at least one client when at least one of the plurality of temporal events occur.

33. A semantic network providing a network semantic graph comprising concept instances and relations between the concept instances, the semantic network comprising:
   a plurality of semantic servers in communication with each other and with distributed sources, wherein each of the plurality of semantic servers comprises:
      an input/output module to receive data including semantically descriptive annotations from the distributed sources;
      a processor programmed to process the data based on the semantically descriptive annotations of the data to form a local semantic graph that associates the concept instances with each other using the relations, to create at least one subscription of interest in response to a request from at least one client and to send at least one alert to the at least one client based on updates to the local semantic graph matching the at least one subscription of the at least one client; and
      memory for storing the local semantic graph;
   wherein each local semantic graph of each of the plurality of semantic servers comprises a portion of the network semantic graph distributed across the plurality of semantic servers.

34. The semantic network of claim 33, wherein each semantic server includes a server link interface to automatically replicate portions of a semantic graph of a remote server based on each semantic server's client subscriptions.

35. The semantic network of claim 33, wherein each semantic server locally caches portions of the semantic graph for other remote semantic servers and deletes at least one portion of a semantic graph learned from other semantic servers once the at least one portion is not used for a period of time by the clients served by each respective semantic server.

36. The semantic network of claim 33, wherein each concept instance includes a field identifying a local semantic server as its originating source; wherein the processor of one of the plurality of semantic servers is identified by a concept instance as an originating one of the plurality of semantic servers, and wherein the originating one of the plurality of semantic servers is further programmed to update that concept instance; and wherein each processor of each of the plurality of semantic servers is further programmed to store copies of concept instances identifying other ones of the plurality of semantic servers as an originating semantic server depending on a level of use of those concept instances by that one of the plurality of semantic servers.

37. The semantic network of claim 33, wherein processors of some of the plurality of semantic servers are programmed to update the network semantic graph while processors of others of the plurality of semantic servers are programmed to operate on the network semantic graph.

38. The semantic network of claim 33, wherein each processor of the plurality of semantic servers is further programmed to monitor the semantic graph and to process the semantic graph in response to changes in at least one of the concept instances, properties and relations represented by the semantic graph.

39. The semantic network of claim 33, wherein each of the plurality of semantic servers includes at least one semantic application for processing data represented by the semantic graph, the at least one semantic applications being represented as a concept instance on the semantic graph.

40. The semantic network of claim 33, wherein semantic applications being added to the plurality of semantic servers while the semantic servers operate without disrupting operation thereof.

41. The semantic network of claim 33 wherein a data source is represented in the semantic graph as a concept instance with at least one source identifier associated therewith that is available when accessing the concept instance in the semantic graph.

42. The semantic network of claim 33, wherein at least one client is represented in the semantic graph as a concept instance.

43. The semantic network of claim 33, wherein the network semantic graph being representative of at least one of military tactical information, maritime domain information, emergency management information and corporate security information.

44. The semantic network of claim 33, wherein the processor is further programmed to receive a query from at least one client; to search the network semantic graph based on the query; and to send the at least one client a response based on a result of the searching.

45. The semantic network of claim 33, wherein some of the distributed sources include attributes of the at least one client.

* * * * *